No. 755,433. PATENTED MAR. 22, 1904.
J. H. BAKER.
FORGING APPARATUS.
APPLICATION FILED SEPT. 21, 1903.
NO MODEL. 5 SHEETS—SHEET 3.

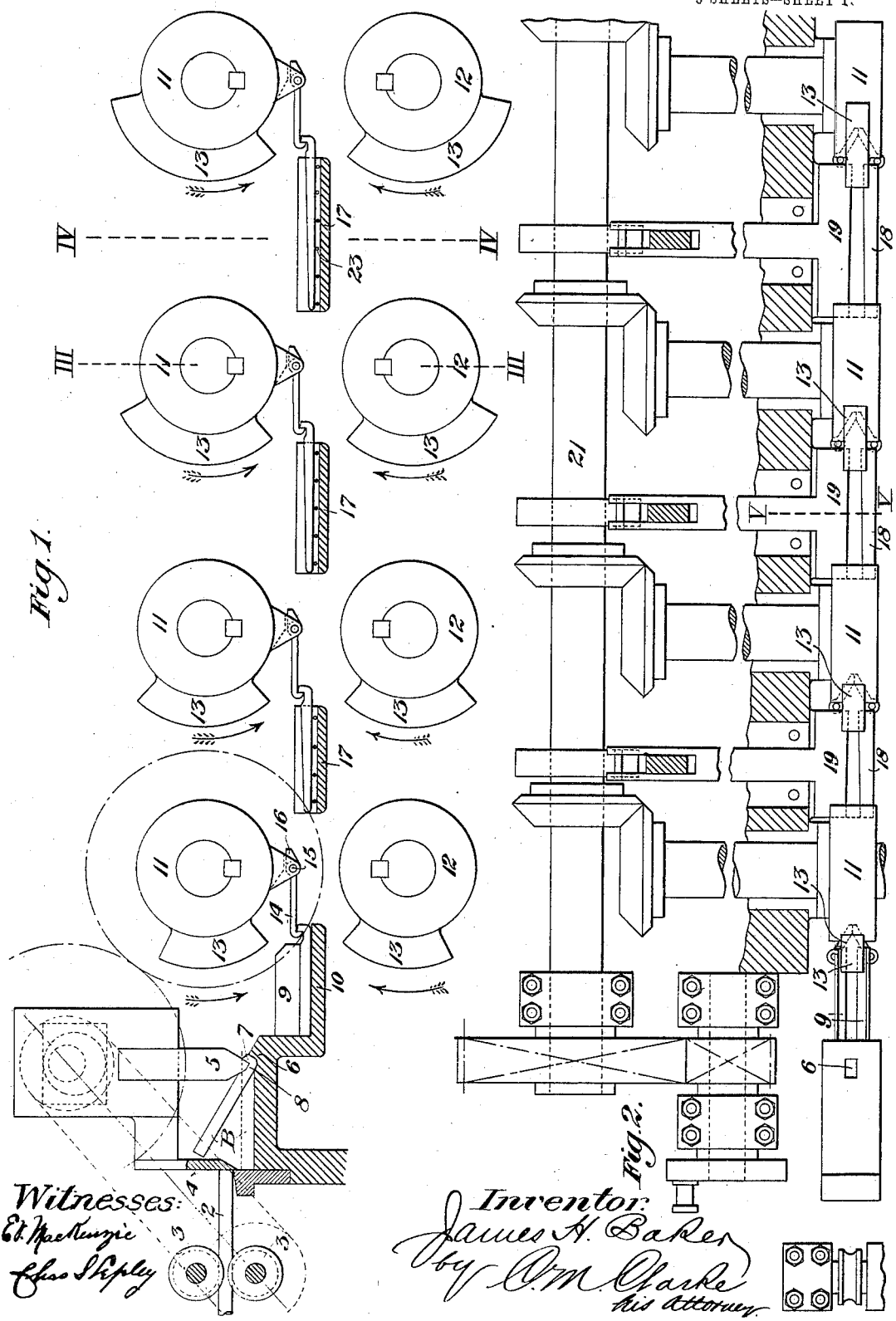

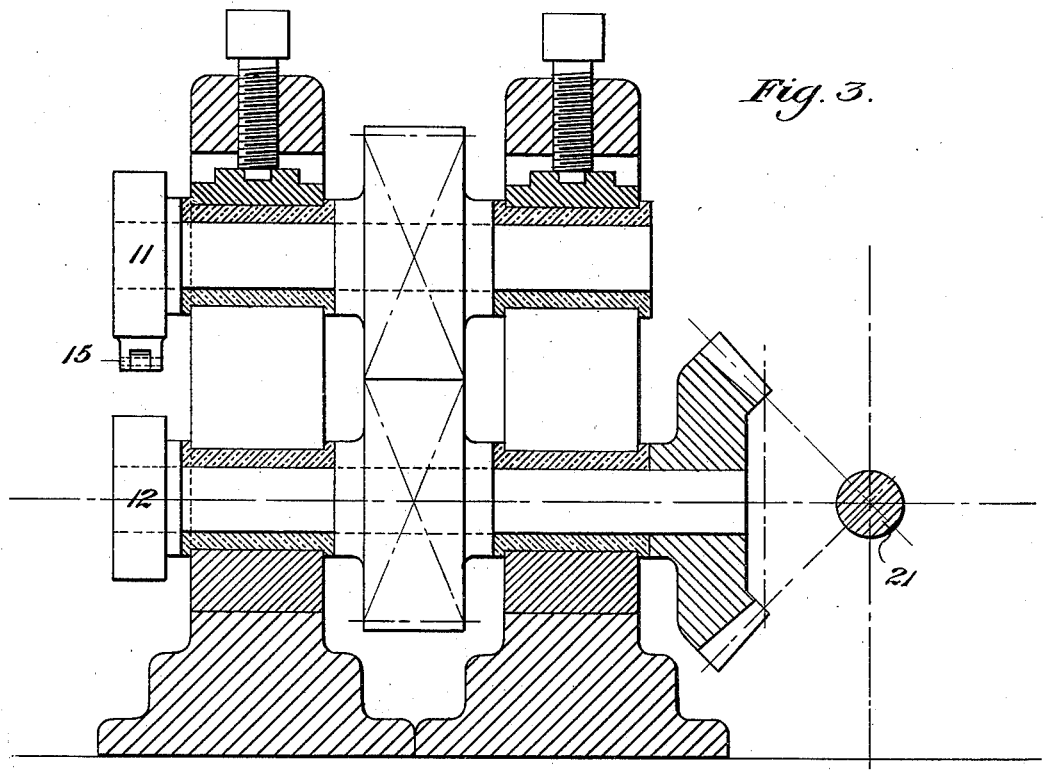
Fig. 3.
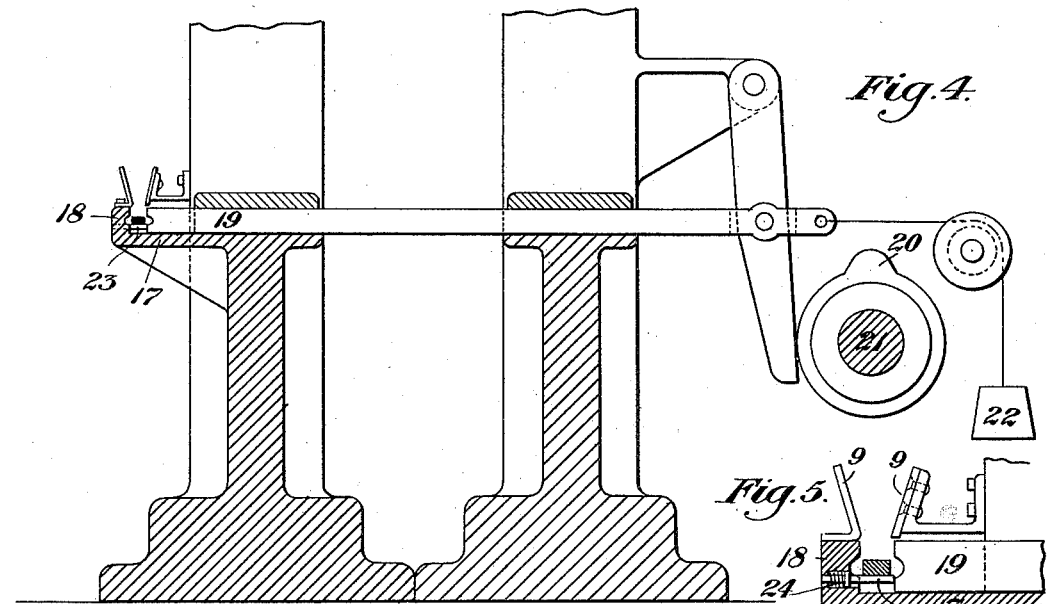
Fig. 4.
Fig. 5.

Witnesses: Inventor.

No. 755,433. PATENTED MAR. 22, 1904.
J. H. BAKER.
FORGING APPARATUS.
APPLICATION FILED SEPT. 21, 1903.
NO MODEL. 5 SHEETS—SHEET 4.

Witnesses: Inventor:

No. 755,433. PATENTED MAR. 22, 1904.
J. H. BAKER.
FORGING APPARATUS.
APPLICATION FILED SEPT. 21, 1903.
NO MODEL. 5 SHEETS—SHEET 5.
 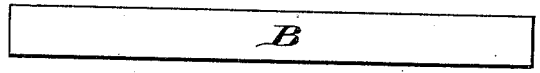
Fig. 13.
 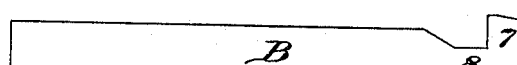
Fig. 14.
 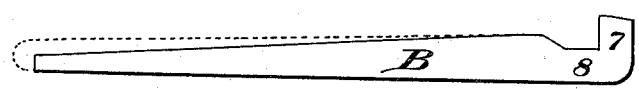
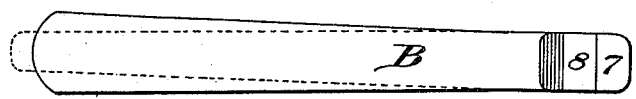
Fig. 15.
 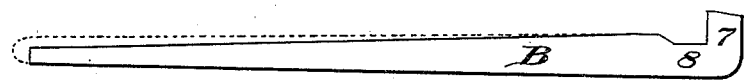
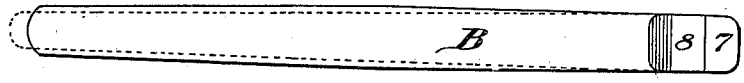
Fig. 16.
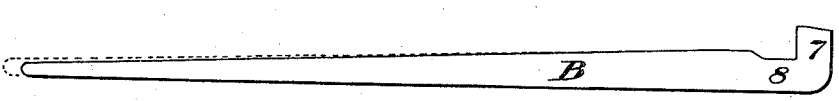
Fig. 17.
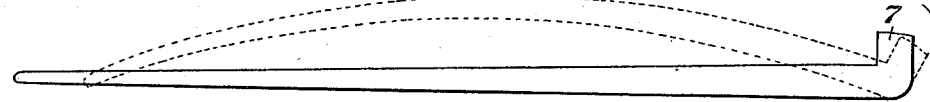
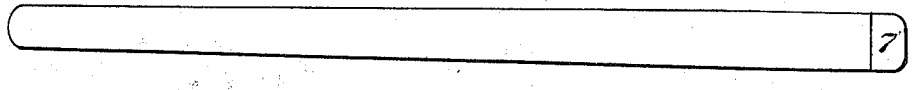
Fig. 18.
Witnesses: E. V. MacKenzie, Chas. I. Lipley
Inventor: James H. Baker
by O. M. Clarke
his Attorney
THE NORRIS PETERS CO., PHOTO-LITHO., WASHINGTON, D. C.

No. 755,433. Patented March 22, 1904.

UNITED STATES PATENT OFFICE.

JAMES H. BAKER, OF PITTSBURG, PENNSYLVANIA.

FORGING APPARATUS.

SPECIFICATION forming part of Letters Patent No. 755,433, dated March 22, 1904.

Application filed September 21, 1903. Serial No. 174,051. (No model.)

*To all whom it may concern:*

Be it known that I, JAMES H. BAKER, a citizen of the United States, residing at Pittsburg, in the county of Allegheny and State of Pennsylvania, have invented certain new and useful Improvements in Forging Apparatus, of which the following is a specification, reference being had therein to the accompanying drawings, forming part of this specification, in which—

Figure 6:
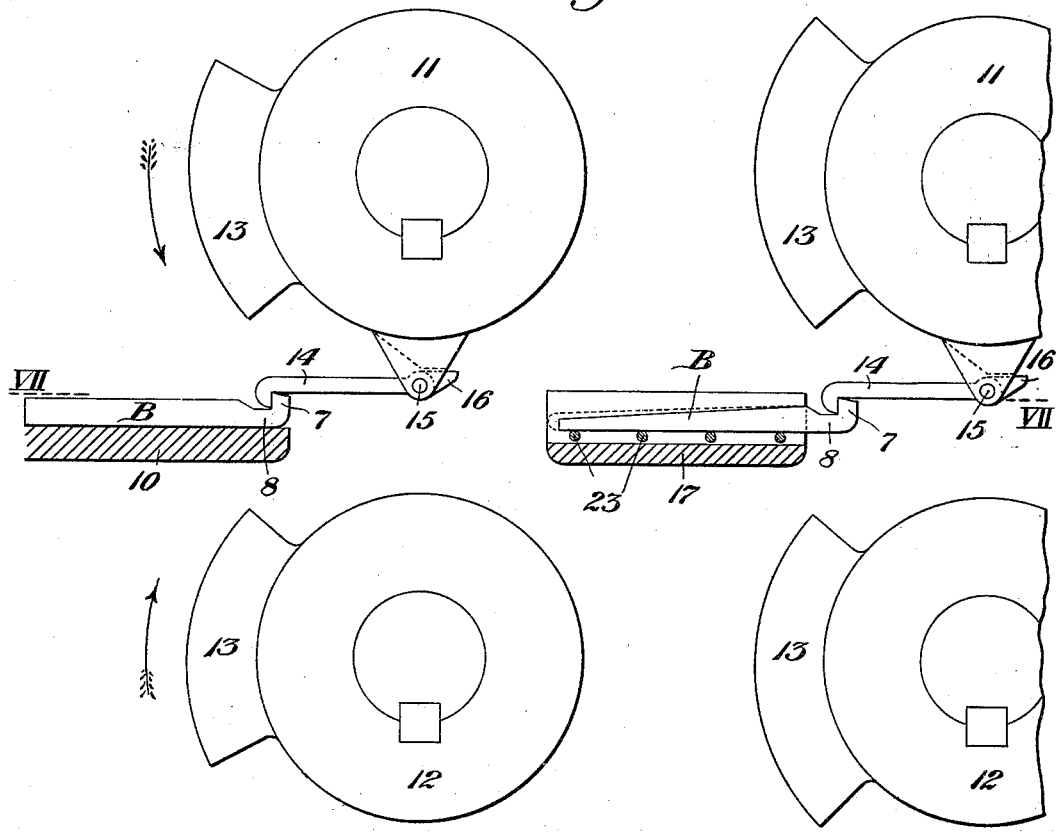
Figure 7:
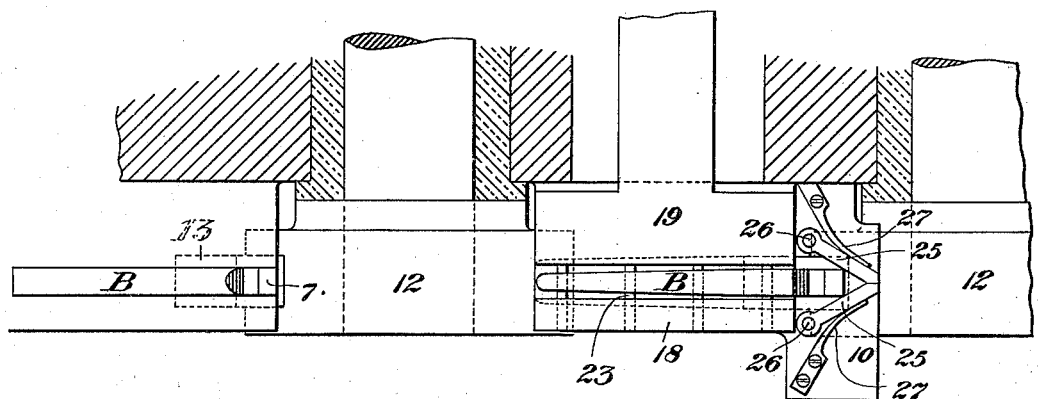
Figure 8:
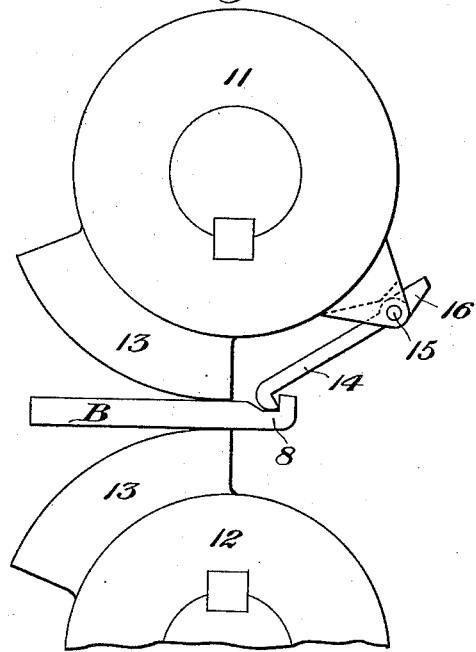
Figure 9:
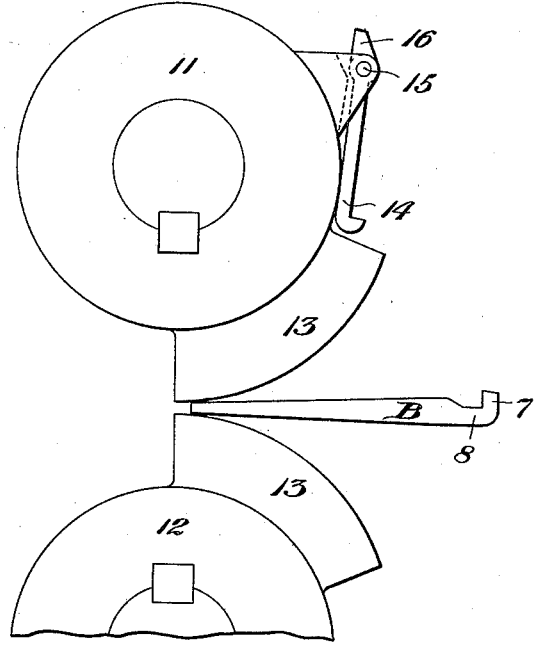
Figures 10, 12:
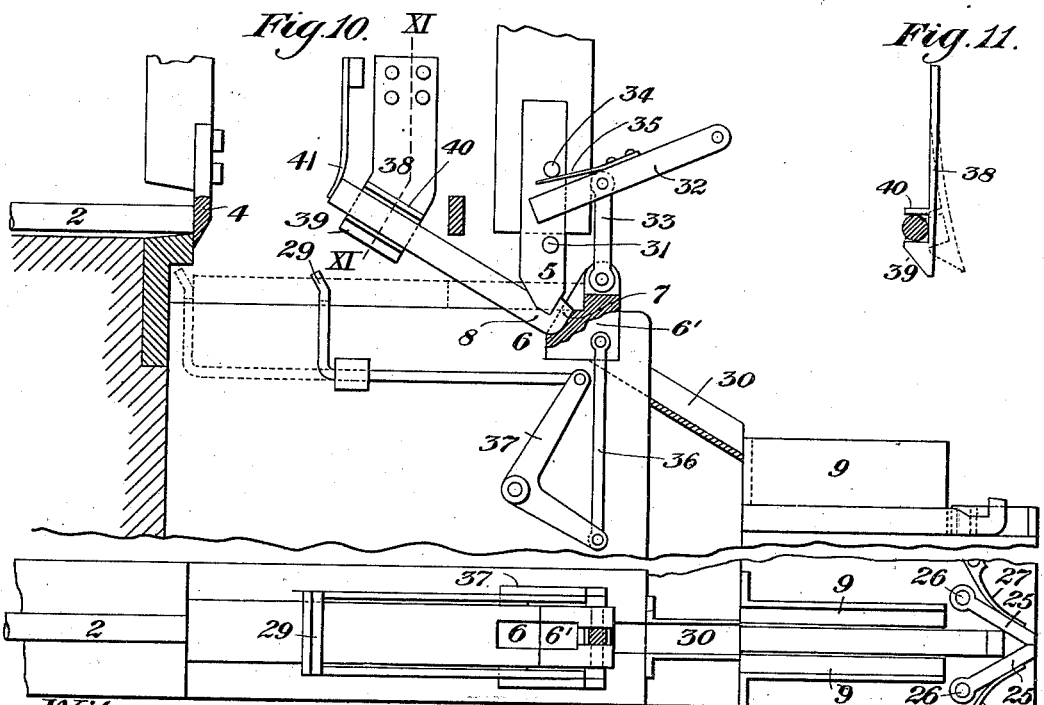
Figure 11:
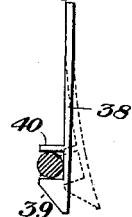

Figure 1 is a diagrammatic vertical sectional elevation of my improved forging apparatus, showing the mechanism employed for the various steps of the operation. Fig. 2 is a partial plan view, partly broken away, illustrating the driving-gearing. Fig. 3 is a vertical sectional view through one of the stands of rolls indicated by the section-line III III of Fig. 1. Fig. 4 is a similar view indicated by the line IV IV of Fig. 1. Fig. 5 is a vertical sectional view through one pair of the laterally-acting swaging-dies indicated by the line V V of Fig. 2. Fig. 6 is a detail view showing the first and second sets of swaging-rolls with a supporting-platform for the blank and the various pairs of swaging-dies in section. Fig. 7 is a sectional plan view indicated by the line VII VII of Fig. 6. Figs. 8 and 9 are detail face views of the first pair of swaging-rolls, illustrating the commencement and finish of the first rolling operation. Fig. 10 is a side view, partially in section, of one form of mechanism employed in forming the head of the blank and for delivering it to a position in advance of the first pair of rolls. Fig. 11 is a cross-sectional view on the line XI XI of Fig. 10. Fig. 12 is a plan view of the under head-forming dies, the guides, and supporting-platform for the blank. Fig. 13 represents the blank before it is operated upon. Fig. 14 represents the blank after the first operation of forming the head. Figs. 15, 16, 17, and 18 show in side elevation and plan, respectively, the blank in its successive steps of development, the dotted lines indicating the outline of the blank as produced by the swaging-dies.

The object of my invention is to provide means for producing a finished brake-shoe key or other similar device from a blank of round or other cross-section by a continuous series of forging operations in one heat and without manual manipulation. The mechanism which I have provided is designed to first form a turned-up head or lug, constituting the finished top of the key and by which it is drawn through the apparatus from one step to the next, the various forging operations being carried on both by swaging rolls and dies, as I shall now proceed to describe.

Referring to the drawings, 2 represents a bar of metal which is fed forwardly by rolls 3 3 or other suitable means and is sheared off in lengths by a shear 4 or its equivalent. The blank (indicated throughout by the letter B and shown in dotted lines in advance of the shear) is then subjected to the first forging operation by moving die 5, coöperating with a stationary die 6, by which the lug or head 7 is formed on the blank, and its thickness is reduced, as at 8, to the finished cross-section of the shank of the key at its upper end. The form or detail construction of the dies 5 and 6 do not necessarily conform to any particular dimensions, as the lug may vary in design and is preferably somewhat rounded, as are also the outer edges of the blank. The construction and operation of these dies will be understood without further description, although I have shown in Fig. 10 further illustration of them and of one form of mechanism by which the blank may be manipulated or discharged from the forming-dies and delivered to a position in advance of the first pair of swaging-rolls.

9 represents downwardly and forwardly tapering guides adapted to receive and direct the blank and to deliver it upon a support or table 10, with the lug 7 projecting upwardly in the position to be engaged by the downwardly-extending hook, hereinafter described.

11 12 are the upper and lower swaging-rolls, provided with tapering swaging-dies 13 13, adapted to engage the blank some distance behind its head and to reduce it with a gradual tapering elongation, as will be readily understood and as is clearly shown in Figs. 1 and 15 to 18, inclusive.

For the purpose of drawing the blank forwardly, so that it will be properly engaged by the swaging-dies, one of the rolls 11 is provided with a hook 14, pivotally mounted in suitable lugs or bearings on the roll at 15 and provided with an extension or projecting lug 16, by which the hook is prevented from turning over in its rotation of the roll. The lug also arrests the hook, so that in its down travel it will be held outwardly in such a position as to accurately engage the lug 7 of the blank, as clearly shown in the drawings, drawing it forwardly until it is engaged by the swaging-dies 13. These dies carry it forwardly, partially reducing it, the hook becoming released as it passes upwardly with the roll, while the blank is delivered forwardly between similar guides 9 and between the first pair of side swaging-dies. These side swaging-dies are arranged between each pair of rolls for the purpose of laterally reducing the blank and of rounding its edges.

The construction of the side swaging-dies may be of different design to suit the work in view, and I have shown in the drawings a form in which an outwardly-extending shelf or bracket 17, secured to or forming a part of the main housing, is so arranged as to aline with the path of travel of the blank as it is delivered from the rolls. The outer end of the bracket is turned upwardly and provided with an integral or attached stationary die 18, while an inner movable die 19 is arranged to cooperate with and press the blank against the said stationary die. The movable die and stationary die are each provided with interior concave or rounded faces, which give a finished rounded contour to the edges of the blank, and the movable die 19 is pressed forwardly by means of a cam 20, mounted upon main power-shaft 21, the cam acting against said mechanism, as indicated in Fig. 4. By this means forward motion is transmitted to the movable die 19, the die being retracted by a counterweight 22 or other equivalent mechanism.

For the purpose of supporting the blank in alinement with the grooves of the dies and providing sufficient stock in the dies I have provided a series of supporting pins or rods 23, mounted in the stationary die 18 and adapted to be depressed backwardly by the movable die against pressure-springs 24, which springs automatically extend the supporting-pins when the die is retracted. The purpose of this construction is to provide a support for the blank above the base upon which the movable die is mounted, thereby allowing for sufficient metal below the groove of said die. Downwardly and inwardly tapering guides 9 9 are also provided above the dies 18 19, so as to receive and guide the blank downwardly and always maintain the lug 7 in a vertical position for engagement of the hook 13. Another advantage of these guides is that they will constantly tend to keep the blank in alinement, correcting any lateral movement resulting from the pressure of the movable swaging-die.

The swaging-dies 13 of the rolls are of sufficient width to engage the blank, and in its passage between them there is a tendency to tip upwardly on emerging after they pass out. The inwardly-slanting guides will receive and direct the blank constantly toward its central position of alinement with the roll-dies.

In advance of the swaging-dies, mounted upon bracket 17 and also in advance of the blank in its position in front of the first roll after leaving the first lug-forming operation and mounted upon bracket 10, are a pair of guides 25, pivoted at 26 and normally pressed inwardly by springs 27. In their closed form they provide a V-shaped receiving friction-buffer for the blank. The blank in its first movement is projected inwardly with considerable force by the rolls, and these guides are provided for the purpose of positively checking and holding the blank in position in front of the rolls to be engaged by the hook. Other friction means may be substituted, as is obvious, and I do not desire to be limited to this specific form of limiting device.

In Fig. 10 I have shown in detail a modified or one form of construction adapted to operate upon and manipulate the blank in preparing it for the first pass. The blank after being sheared by the knife 4 drops down into the position indicated in dotted lines in advance of an upwardly-extending shunt-bar 29. A portion 6' of the die 6 is adapted to be raised upwardly out of the way for the blank after it has been operated by die 5, so as to permit the blank to be projected forwardly and down an inclined chute 30, whereby it is delivered between the guides 9. In it upward travel the die 6' by its inclined face raises and forces the blank backwardly against the pressure of a spring 41, which spring when die 6' is sufficiently high projects the blank forwardly and downwardly through trough 30 onto table 10.

The movable die 6' is raised by a pin or abutment 31 on the die 5, said abutment engaging a pivoted lever 32, connected with die 6 by link 33. The die 6' is lowered in a similar manner by gravity or positively by means of an abutment 34, pressing downwardly against a spring 35, thus insuring the die 6' being in position before the forging operation. The die 6' or a corresponding movable element is connected by a link 36 with a bell-crank lever 37, which in turn is connected with the shunt-bar 29. By this construction as die 6' is lowered to position the blank will be caused to travel forwardly immediately before the die 5 descends, at which time the die 6' is in position for performing its function.

The forging operation is done by die 5 descending upon the horizontal blank, forming the head by forcing it down into the recesses of dies 6 and 6', causing the blank to be tilted upwardly to an angle, as indicated in Fig.

10, and for the purpose of maintaining it in such tilted position, so that it will be ready to slide downwardly when die 6' is raised, I have provided a supporting-bracket 38, provided with a lower tapering portion 39 and an upper retaining-wall 40, between which and the lower supporting portion the blank will be forced, the bracket 38 being preferably made in such a manner as to permit it to be depressed backwardly by the blank and resuming its normal supporting position by means of a spring or other suitable means.

The operation is as follows: The blank having been sheared to the proper length is transferred or fed downwardly to the position in front of the first pair of swaging-rolls upon bracket 10, the lug 7 extending upwardly. This lug is immediately engaged by hook 14, which draws the blank between the rolls, the swaging-dies 13 then engaging it and forming the first reduction. The blank is then delivered between the first pair of horizontally-acting swaging-dies 18 and 19, which compress it laterally and somewhat thicken the blank, as indicated in dotted lines in Fig. 15 to Fig. 17, inclusive. The blank is then engaged by the next pair of swaging-rolls, passing therefrom to the next succeeding pair of swaging-dies, the operation being continuous until the blank is finally delivered from the last pair of swaging-rolls in its finished shape. After the first operation of forming the head the head of the blank receives no further reduction. Its body portion is by the rolls and dies gradually tapered and lengthened by the successive operations. (Clearly indicated in the drawings, particularly Fig. 15 to Fig. 18, inclusive.)

It is desirable to curve the finished key, as indicated in dotted lines in Fig. 18, and this may be done by suitable rolls or any convenient bending mechanism, and as various constructions may be utilized for this purpose it is not necessary to describe such operation in detail.

By the mechanism shown I am enabled to rapidly and accurately form brake-shoe keys or, in fact, any other similar devices, the blank requiring no attention whatever after having been sheared from a round or other form of bar. The turned-up head required in the finished article gives a convenient and suitable means for drawing the blank in between the rolls and is, with the drawing-hook, an important and novel feature of the invention.

Changes and variations may be made by the skilled mechanic in the various details of construction, as it is obvious that the mechanism may be varied to secure the same or equivalent results, and I do not desire to be limited to the specific construction or design which I have shown and described, but to include all such changes and variations as within the scope of the following claims.

What I claim is—

1. A swaging-roll provided with a pivoted hook adapted to engage and draw the blank, substantially as set forth.

2. A swaging-roll provided with a pivoted hook and a limiting-abutment therefor, substantially as set forth.

3. The combination with a pair of swaging-rolls, of a separately-movable hook secured to one of the rolls and adapted to engage and draw a blank between the rolls, substantially as set forth.

4. The combination of pairs of upper and lower swaging-rolls with an intervening stationary die and a laterally-acting compressing-die, substantially as set forth.

5. The combination with a pair of swaging-rolls, of a pair of swaging-dies located beyond the rolls, and friction-buffers located beyond the swaging-dies, substantially as set forth.

6. The combination with a pair of swaging-rolls, of a pair of swaging-dies located beyond the rolls, and friction-buffers located beyond the swaging-dies, with means secured to one of the rolls for engaging and drawing the blank between said rolls, substantially as set forth.

7. The combination of head-forming dies, directing-guides, a supporting-platform provided with friction-buffers, swaging-rolls, means for ejecting the blank from the head-forming dies to the rolls, means connected with one of the rolls for engaging the blank and drawing it between the rolls, with means for actuating the head-forming dies and the swaging-rolls, respectively, substantially as set forth.

8. The combination of head-forming dies, vertically-disposed directing-guides in advance thereof adapted to receive the blank and to maintain it with the top edge upwardly, a supporting-base for the blank, swaging-rolls beyond said base, means for ejecting the blank from the head-forming dies to the rolls, with means for engaging the head of the blank and drawing it between the swaging-rolls, and connected means for actuating the head-forming dies and the swaging-rolls respectively, substantially as set forth.

9. The combination of head-forming dies, vertically-disposed directing-guides in advance thereof adapted to receive the blank and to maintain it with the top edge upwardly, a supporting-base for the blank, friction-buffers located at the front end of the supporting-base adapted to engage the head of the blank, means for ejecting the blank from the head-forming dies to the rolls, swaging-rolls beyond said buffers, with means for engaging the head of the blank and drawing it between the swaging-rolls, and connected means for actuating the head-forming dies and the swaging-rolls respectively, substantially as set forth.

10. The combination of head-forming dies, vertically-disposed directing-guides in advance thereof adapted to receive the blank and to maintain it with the top edge upwardly, a supporting-base for the blank, swaging-rolls beyond said base, means for ejecting the blank from the head-forming dies to the rolls, one of said rolls being provided with a hook adapted to engage the head of the blank and draw it between the rolls, and connected means for actuating the head-forming dies and the swaging-rolls respectively, substantially as set forth.

11. The combination of shears, head-forming dies, vertically-disposed directing-guides in advance thereof adapted to receive the blank and to maintain it with the top edge upwardly, a supporting-base for the blank, swaging-rolls beyond said base, means for ejecting the blank from the head-forming dies to the rolls, with means for engaging the head of the blank and drawing it between the swaging-rolls, and connected means for actuating the head-forming dies, shears and swaging-rolls respectively, substantially as set forth.

12. The combination of head-forming dies, vertically-disposed directing-guides in advance thereof adapted to receive the blank and to maintain it with the top edge upwardly, a supporting-base for the blank, swaging-rolls beyond said base, means for ejecting the blank from the head-forming dies to the rolls, with means for engaging the head of the blank and drawing it between the swaging-rolls, and stationary and laterally-movable compressing-dies respectively adapted to compress the blank at right angles to the line of reduction of the swaging-rolls, adjacent to said rolls, and connected means for actuating the head-forming dies, the laterally-movable compressing-die, and the swaging-rolls respectively, substantially as set forth.

13. A stationary swaging-die provided with spring-controlled horizontal retractile pins adapted to support the blank thereon, and a movable die coöperating therewith, with means for actuating the movable die, substantially as set forth.

14. In apparatus for forging tapered keys, the combination with lower and upper head-forming dies, of a longitudinally-movable blank-shifting device adapted to project the end of the blank upon the lower die, mechanism operatively connecting the lower die and said shifting device, and means for operating the lower die and actuating the shifting device, substantially as set forth.

15. In apparatus for forging tapered keys, the combination of lower and upper head-forming movable dies, means for operating the dies, blank-shifting mechanism actuated by movement of the lower die, and a supporting device adapted to receive the free end of the blank when tilted upwardly by the head-forming operation and to maintain it in an inclined position for downward travel beyond the dies, with a blank-projecting spring adapted to engage the end of the blank and to project it in the direction of its travel, substantially as set forth.

In testimony whereof I affix my signature in presence of two witnesses.

JAMES H. BAKER.

Witnesses:
C. M. CLARKE,
JAS. J. MCAFEE.